Sept. 19, 1961   H. OBERGFELL   3,000,534
GASOLINE FILLER CAP
Filed Aug. 20, 1959
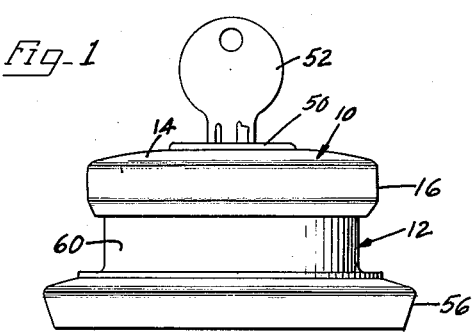
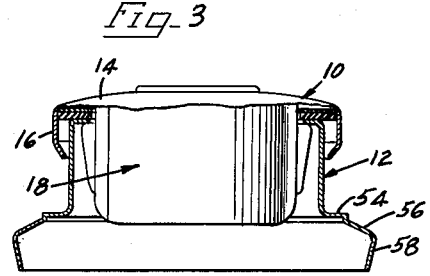
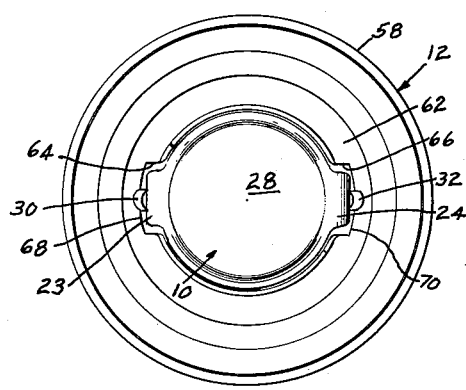
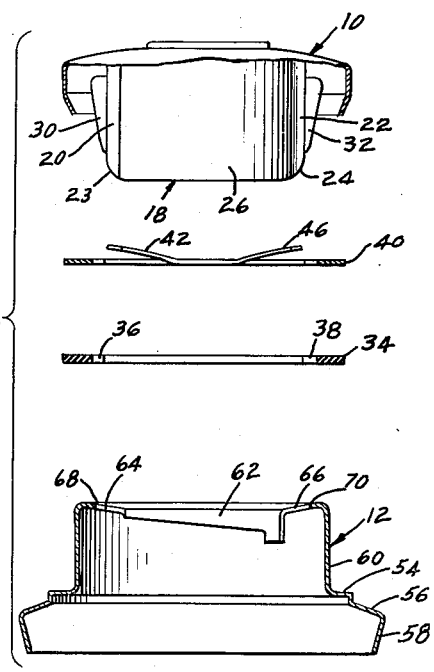
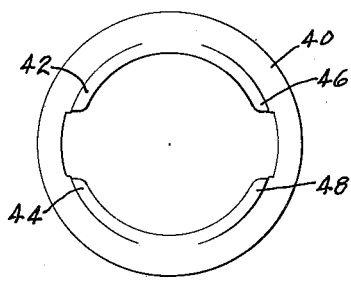
Inventor
Hermann Obergfell

United States Patent Office 3,000,534
Patented Sept. 19, 1961

3,000,534
GASOLINE FILLER CAP
Hermann Obergfell, Elmhurst, Ill., assignor to Badger Manufacturing Corporation, Chicago, Ill., a corporation of Illinois
Filed Aug. 20, 1959, Ser. No. 835,026
2 Claims. (Cl. 220—46)

This invention relates to a filler cap for locking the filler neck of a gasoline tank or the like and more particularly to a filler cap characterized by exceptional simplicity of construction, ease of insertion and removal and effective sealing action.

Although a variety of filler cap constructions have been available for locking the filler neck of a gasoline tank or the like, these have generally required a relatively high degree of complexity for the portions of the filler cap fitting within the filler neck, or else have required complicated actuating mechanism where detent means have been designed to lock externally of the filler cap neck. The present invention provides a filler cap whose appearance is exceptionally clean and simple so that no jagged edges are exposed such as could catch on clothing or the like, but which nevertheless guides the cap into locking position in a manner which prevents it from being tilted inadvertently or otherwise jamming during its insertion into the filler neck. The cap has a body portion with a peripheral annular skirt and a central, generally cylindrical portion depending from the body portion in radially spaced relation to the skirt and having opposed vertical projections, so as to fit within a filler neck tank of the type having an inwardly and downwardly turned flange at the top thereof defining a pair of oppositely aligned recesses for receiving the projections.

In accordance with the invention, an upwardly and outwardly extending detent is carried in each of the projections so as to be cammed inwardly during insertion of the cap and thereafter to lock beneath the flange adjacent the recesses.

Sealing means are provided for the cap including a gasket or washer of preferably resilient and flexible material disposed between the depending cylindrical portion of the cap and the annular skirt thereof and above the detents. This annular sealing member is recessed to receive the projections on the depending cylindrical portion of the cap and immediately above the sealing member is disposed an annular spring member having opposed pairs of legs on each side of the projections, which are bent upwardly to engage the top of the filler cap and to urge the spring against the annular sealing member, the upper ends of the detents serving to retain the annular sealing member and the annular spring element in position in the cap. Thus when the cap is inserted in the filler neck, the sealing member is urged into sealing engagement with the filler neck flange, and an especially effective seal is formed at the recessed areas of the flange. The detents are releasable by key actuated mechanism within the depending cylindrical portion of the cap in the usual way, and a keyhole structure is provided in the center of the body portion of the cap.

Accordingly, it is an object of the present invention to provide a filler cap for a gasoline tank or the like which has a simplified and clean-lined construction and which will not catch on clothing or the like.

Another object is to provide a filler cap as described which affords a balancing of forces as the cap is inserted into a filler neck therefor.

Another object of the invention is to provide means which cooperate with locking means for the cap to afford a highly effective seal between the cap and the filler neck.

Another object of the invention is to provide a filler cap as described which has opposite vertical projections on a depending cylindrical portion thereof and detent means in said projections to afford easy and balanced insertion and removal of the cap from the filler neck.

Other objects and advantages of the invention will become apparent as the description proceeds in accordance with the drawings in which:

FIGURE 1 is a side elevational view of a filler cap according to the invention in assembled relation to a filler neck;

FIGURE 2 is a bottom plan view of the cap and filler neck shown in FIGURE 1;

FIGURE 3 is a view of a structure corresponding to that shown in FIGURE 1, partially broken away, and substantially in vertical section;

FIGURE 4 is an exploded view of the structure of FIGURE 3; and

FIGURE 5 is a plan view of the spring element shown in FIGURE 4.

Referring now to the drawings, a filler cap 10 is shown according to the invention, which is adapted to close a filler neck 12 for a gasoline tank or the like. The cap 10 includes a body portion 14 having a peripheral annular skirt 16 dimensioned to surround the filler neck 12 and a central, depending and substantially cylindrical portion 18 secured to the body portion 14. A pair of oppositely located, vertically extending projections 20 and 22 are formed integrally with the cylindrical wall 26 of the depending portion 20, and the lower ends 23 and 24 of the projections are beveled upwardly in continuity with the bottom wall 28 of the depending portion 18. A pair of spring actuated detents 30 and 32 is carried in the projections 20 and 22 normally extend upwardly and outwardly so that their lower edges are almost continuous with the projections. The detents 30 and 32 terminate in predetermined spaced relation to the underside of the body portion 14 and support sealing means which include an annular, flexible and preferably resilient gasket or sealing member 34 which is cut out at 36 and 38 to receive the projections 22 and 24. A spring element 40 is disposed immediately above the member 34, which has a generally annular configuration and is similarly cut out to receive the projections 20 and 22, the spring member 40 urging the gasket member 34 against the said detents 30 and 32 by means of upwardly turned legs 42, 44, 46 and 48 integrally formed on opposite sides of the spring member and terminating so as to receive the said projections therebetween.

The upper portion of the body structure 14 is apertured within a central ridge 50 to receive means (not shown) for retracting the detents inwardly in the projections 20 and 22 against the force of spring means in the portion 18, substantially in the usual manner, by turning a key 52. A cover element (not shown) may also be pivotally mounted on the body portion 14 which may be biased to seat on the ridge 50.

The filler neck 12 is constructed to be secured to the gas tank of an automobile or the like, and includes a relatively wide portion 54 having an outwardly angled annular flange 56 and an annular flange 58 for engagement with complementary means on the tank (not shown) as well as a cylindrical portion 60 and an inwardly and downwardly extending flange 62. The flange 62 is recessed at 64 and 66 to receive the projections 20 and 22 therein in guiding relationship and to prevent relative angular rotation of the cap when the projections are thus received in the said recesses.

The inner edges 68 and 70 of the recessed portions 64 and 66 are dimensioned to engage the detents 30 and 32 when the cap is inserted downwardly into the filler neck structure 14 so that the detents will be cammed inwardly during the insertion of the cap and will thereafter engage at their upper ends 36 and 38 beneath the flange structure immediately in back of the edges 68 and 70. At such time, the resilient sealing member 34 and the spring member 40 will be urged upwardly against the resistance of the said spring member and the member 34 will therefore firmly seal the horizontal portion of the flange 62. Since the spring legs 42–48 are disposed adjacent the recessed portions of the filler neck flange, the sealing member will be held especially firmly against the flange areas around the recesses 64 and 66, so that evaporation is held to a minimum, and the location of the detents 30 and 32 in alignment with the recessed areas augments this effective sealing action.

It will thus be seen that the exposed guiding and locking mechanism is cooperatively located and presents clean lines which make the insertion and removal of the cap extremely simple, since the beveled construction of the projections 20 and 22 at their bottom ends 23 and 24 as well as the upwardly and outwardly extending construction of the detents 30 and 32 provide a smooth guiding action as the cap is lowered into the recesses 64 and 66, as well as affording a balance of forces which is not available where detents are located in angularly spaced relation to the guiding projections of the cap.

As indicated, removal of the cap may be readily obtained by insertion of the key 52 in the cap and rotation of the key to draw the detents 30 and 32 inwardly, so that they disengage the flange structure 62 and permit the cap to be drawn upwardly by hand as guided by the projections 20 and 22, and the detents assist the upward movement of the cap by their camming action against the edges 68 and 70 of the flange 62.

Although I have herein set forth and described my invention with respect to certain specific principles and details thereof, it will be understood by thosee skilled in the art that these may be varied without departing from the spirit and scope of the invention as set forth in the hereunto appended claims.

I claim as my invention:

1. A filler cap comprising a disk-like body adapted to overlie a filler neck, a cylindrical lock housing depending centrally from said body, a pair of oppositely disposed radially and axially extending elongated rib-like projections formed on said housing, for substantially the length of said housing, a radially movable detent in each of said projections biased outwardly to a locking position and extending axially of said projection and terminating in proximately spaced relationship to said body, a gasket surrounding said housing in immediately subjacent relationship to said body and above said detents, and snugly receiving said projections, and a spring extending around said housing between said gasket and said body and including an upwardly extending integral spring leg on each side of each of said projections to urge said gasket toward said detents.

2. A filler cap comprising a disk-like body adapted to overlie a filler neck, a cylindrical lock housing depending centrally from said body, a pair of oppositely disposed radially and axially extending elongated rib-like projections formed on said housing for substantially the length of said housing and a radially movable detent in each of said projections biased outwardly to a locking position and extending axially of said projection and terminating in proximately spaced relationship to said body, the alignment and disposition of said detents in said projections permitting the projections to guide the filler cap into a filler neck having recesses in an in-turned neck flange thereof to receive the projections without tilting or jamming of the filler cap therein.

References Cited in the file of this patent

UNITED STATES PATENTS

| | | |
|---|---|---|
| 2,001,824 | Maierle | May 21, 1935 |
| 2,696,100 | Nehls | Dec. 7, 1954 |

FOREIGN PATENTS

| | | |
|---|---|---|
| 663,596 | France | Apr. 9, 1929 |
| 321,734 | Italy | Oct. 15, 1934 |